(12) United States Patent
Liu et al.

(10) Patent No.: US 11,593,735 B2
(45) Date of Patent: Feb. 28, 2023

(54) AUTOMATED AND EFFICIENT PERSONAL TRANSPORTATION VEHICLE SHARING

(71) Applicant: International Business Machines Corporation, Armonk, NY (US)

(72) Inventors: Su Liu, Austin, TX (US); Yu Gu, Austin, TX (US); Dingcheng Li, Rochester, MN (US); Kai Liu, Malden, MA (US)

(73) Assignee: International Business Machines Corporation, Armonk, NY (US)

( * ) Notice: Subject to any disclaimer, the term of this patent is extended or adjusted under 35 U.S.C. 154(b) by 631 days.

(21) Appl. No.: 16/417,974

(22) Filed: May 21, 2019

(65) Prior Publication Data

US 2020/0372428 A1 Nov. 26, 2020

(51) Int. Cl.
*G06Q 10/00* (2012.01)
*G06Q 10/0631* (2023.01)
(Continued)

(52) U.S. Cl.
CPC ... *G06Q 10/06315* (2013.01); *G01C 21/3438* (2013.01); *G06N 3/08* (2013.01);
(Continued)

(58) Field of Classification Search
CPC ......... G06Q 10/06315; G06Q 30/0205; G06Q 30/0645; G06Q 50/30; G01C 21/3438;
(Continued)

(56) References Cited

U.S. PATENT DOCUMENTS

| 7,898,439 B2 | 3/2011 | Bettez et al. |
| 8,121,785 B2 | 2/2012 | Swisher et al. |

(Continued)

FOREIGN PATENT DOCUMENTS

| WO | WO 2013/142977 | 10/2013 |
| WO | WO 2016/166613 | 10/2016 |

OTHER PUBLICATIONS

Mell et al., "The NIST Definition of Cloud Computing", National Institute of Standards and Technology, U.S. Dept. of Commerce, NIST Special Publ. 800-145, Sep. 2011, 7 pages.

(Continued)

*Primary Examiner* — Tyler J Lee
*Assistant Examiner* — Tiffany P Ohman
(74) *Attorney, Agent, or Firm* — Edward J. Wixted, III, Esq.; Rachel l. Pearlman, Esq.; Heslin Rothenberg Farley & Mesiti P.C.

(57) ABSTRACT

A method, computer program product, and a system where a processor(s) determines generates a cognitive user profile representing patterns of usage of each of a plurality of users of the transportation resource sharing system, a cognitive resource profile for each resource of the plurality of resources, a cognitive route profile for each route traversed by at least one resource of the plurality of resources, and a cognitive station profile for each station of the plurality of stations. The processor(s) assigns one or more specific resources of the plurality of resources to one or more specific users of the plurality of users and the one or more specific resources of the plurality of resources to one or more specific stations of the plurality of stations.

18 Claims, 7 Drawing Sheets

(51) Int. Cl.
   *G06Q 30/0645* (2023.01)
   *G06Q 30/0204* (2023.01)
   *G06Q 50/30* (2012.01)
   *G06N 5/046* (2023.01)
   *G08G 1/00* (2006.01)
   *G08G 1/127* (2006.01)
   *G06N 3/08* (2023.01)
   *G01C 21/34* (2006.01)

(52) U.S. Cl.
   CPC ......... *G06N 5/046* (2013.01); *G06Q 30/0205* (2013.01); *G06Q 30/0645* (2013.01); *G06Q 50/30* (2013.01); *G08G 1/127* (2013.01); *G08G 1/20* (2013.01)

(58) Field of Classification Search
   CPC .......... G06N 3/08; G06N 5/046; G08G 1/127; G08G 1/20
   USPC ....................................................... 701/410
   See application file for complete search history.

(56) References Cited

U.S. PATENT DOCUMENTS

| | | |
|---|---|---|
| 9,157,742 B1 | 10/2015 | Fahrner et al. |
| 9,194,955 B1 | 11/2015 | Fahrner et al. |
| 9,271,328 B2 | 2/2016 | Chang et al. |
| 9,552,729 B2 | 1/2017 | Gontmakher et al. |
| 2002/0019760 A1* | 2/2002 | Murakami ........... G06Q 10/047 |
| | | 705/7.25 |
| 2012/0239248 A1 | 9/2012 | Bobbitt |
| 2014/0266588 A1 | 9/2014 | Majzoobi |
| 2016/0320198 A1 | 11/2016 | Liu et al. |
| 2019/0325757 A1* | 10/2019 | Goel ................. G06Q 10/0631 |

OTHER PUBLICATIONS

Liu et al., "Rebalancing Bike Sharing Systems: A Multi-source Data Smart Optimization", KDD '16, Aug. 13-17, 2016, San Francisco, CA. 10 pages.

Chen et al., "Dynamic Cluster-Based Over-Demand Prediction in Bike Sharing Systems", UbiComp '16, Aug. 2016, 37 pages.

* cited by examiner

AUTOMATED AND EFFICIENT PERSONAL TRANSPORTATION VEHICLE SHARING

BACKGROUND

Because of many reasons, including but not limited to, the cost of personal transportation vehicle maintenance and storing, sharing regularly maintained recreational and transportation vehicles, such as automobiles, bicycles, unicycles, motorized bicycles and tricycles, manually operated scooters, motorized scooters, skateboards, motorized skateboards, skates, etc., is growing in popularity, particularly in urban environments. The sharing of these vehicles is so prevalent that new types of personal transportation vehicles are being introduced into various markets, for sharing in primarily urban environments.

SUMMARY

Shortcomings of the prior art are overcome and additional advantages are provided through the provision of a method for distributing resources in in a shared resource system. The method includes, for instance: generating, by one or more processors of a transportation resource sharing system, a cognitive user profile representing patterns of usage of each of a plurality of users of the transportation resource sharing system, wherein each user utilized at least one resource of a plurality of resources in the transportation resource sharing system, over time, the at least one resource obtained by each user from at least one resource station of a plurality of stations, wherein each resource station of the plurality of stations comprises a physical location where each user collects or deposits the at least one resource; generating, by the one or more processors, a cognitive resource profile for each resource of the plurality of resources, based on classifying each resource in a defined maintenance level, wherein the defined maintenance level is selected from a ranked scale of defined maintenance levels, wherein the generating comprises analyzing raw data comprising historical maintenance events for each resource to machine learn one or more relationships between elements in the raw data, and classifying, by the one or more processors, each resource into the defined maintenance level, based on the learned one or more relationships; generating, by the one or more processors, a cognitive route profile for each route traversed by at least one resource of the plurality of resources, based on analyzing continuously collected data related to route conditions of each route, wherein, for each route, the cognitive route profile characterizes the conditions on the route impacting viability of resources of the plurality of resources traversing the route; generating, by the one or more processors, a cognitive station profile for each station of the plurality of stations, each profile representing current supply and demand requirements at each station, wherein determining the supply and demand requirements at each station comprises analyzing historical supply and demand data accessible to the one or more processors and applying a predictive algorithm to generate the current supply and demand requirements; assigning, by the one or more processors, one or more specific resources of the plurality of resources to one or more specific users of the plurality of users, based on applying a cognitive matching algorithm to inputs comprising the cognitive user profile for each user, the cognitive resource profile for each resource, the cognitive route profile for each route, and the cognitive station profile for each station, wherein the assigning establishing a common maintenance cycle for the one or more specific resources; and assigning, by the one or more processors, the one or more specific resources of the plurality of resources to one or more specific stations of the plurality of stations, based on applying an additional cognitive matching algorithm to the inputs, wherein the assigning balances supply of resources of the plurality of resources, to meet a predicted demand for resources of the plurality of resources, at one or more specific stations.

Shortcomings of the prior art are overcome and additional advantages are provided through the provision of a computer program product for distributing resources in a shared resource system. The computer program product comprises a storage medium readable by a processing circuit and storing instructions for execution by the processing circuit for performing a method. The method includes, for instance: generating, by one or more processors of a transportation resource sharing system, a cognitive user profile representing patterns of usage of each of a plurality of users of the transportation resource sharing system, wherein each user utilized at least one resource of a plurality of resources in the transportation resource sharing system, over time, the at least one resource obtained by each user from at least one resource station of a plurality of stations, wherein each resource station of the plurality of stations comprises a physical location where each user collects or deposits the at least one resource; generating, by the one or more processors, a cognitive resource profile for each resource of the plurality of resources, based on classifying each resource in a defined maintenance level, wherein the defined maintenance level is selected from a ranked scale of defined maintenance levels, wherein the generating comprises analyzing raw data comprising historical maintenance events for each resource to machine learn one or more relationships between elements in the raw data, and classifying, by the one or more processors, each resource into the defined maintenance level, based on the learned one or more relationships; generating, by the one or more processors, a cognitive route profile for each route traversed by at least one resource of the plurality of resources, based on analyzing continuously collected data related to route conditions of each route, wherein, for each route, the cognitive route profile characterizes the conditions on the route impacting viability of resources of the plurality of resources traversing the route; generating, by the one or more processors, a cognitive station profile for each station of the plurality of stations, each profile representing current supply and demand requirements at each station, wherein determining the supply and demand requirements at each station comprises analyzing historical supply and demand data accessible to the one or more processors and applying a predictive algorithm to generate the current supply and demand requirements; assigning, by the one or more processors, one or more specific resources of the plurality of resources to one or more specific users of the plurality of users, based on applying a cognitive matching algorithm to inputs comprising the cognitive user profile for each user, the cognitive resource profile for each resource, the cognitive route profile for each route, and the cognitive station profile for each station, wherein the assigning establishing a common maintenance cycle for the one or more specific resources; and assigning, by the one or more processors, the one or more specific resources of the plurality of resources to one or more specific stations of the plurality of stations, based on applying an additional cognitive matching algorithm to the inputs, wherein the assigning balances supply of resources of the plurality of resources, to meet a predicted demand for resources of the plurality of resources, at one or more specific stations.

Methods and systems relating to one or more aspects are also described and claimed herein. Further, services relating to one or more aspects are also described and may be claimed herein.

Additional features are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
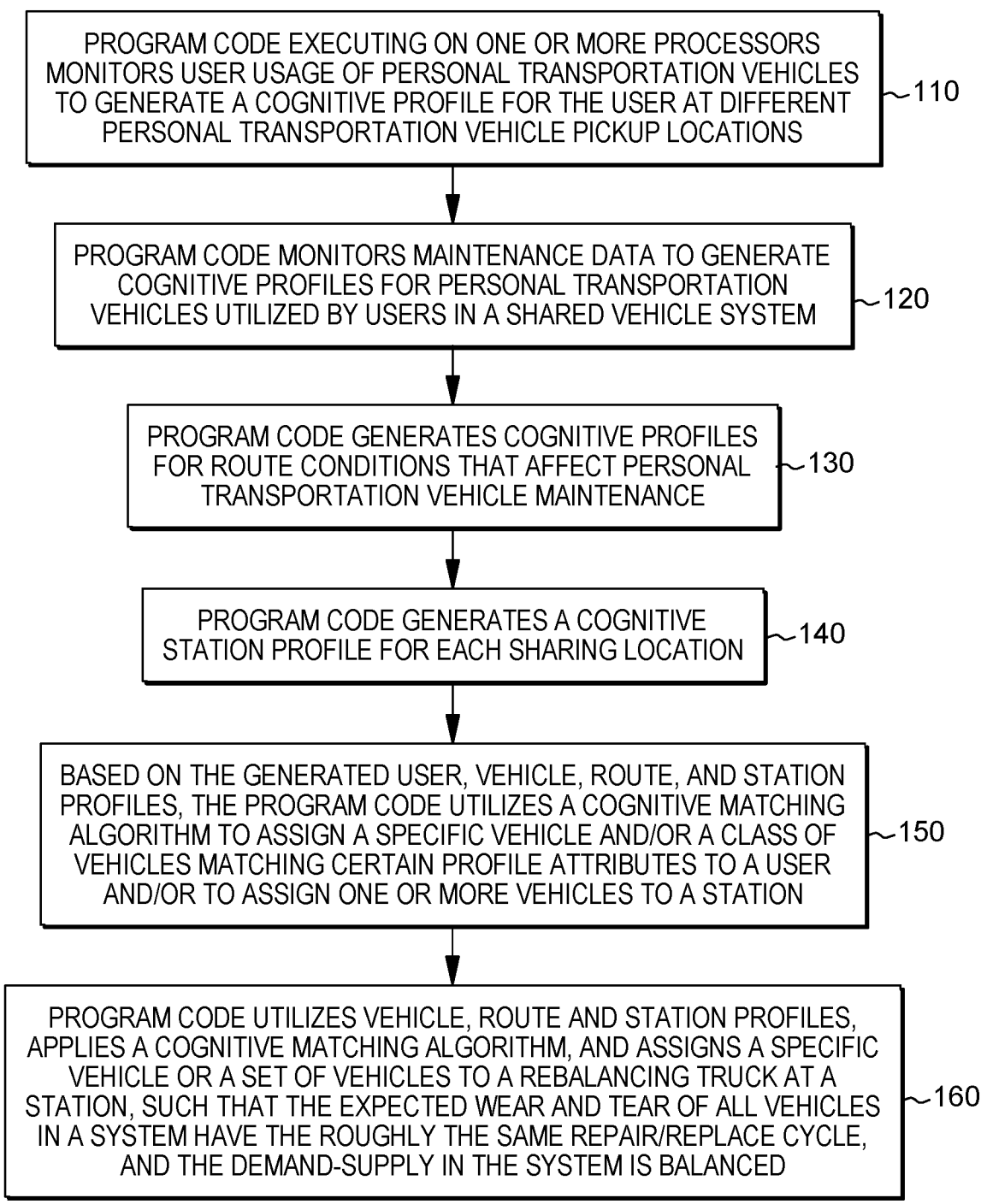
FIG. 1 is a workflow that illustrates certain aspects of some embodiments of the present invention.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 5:
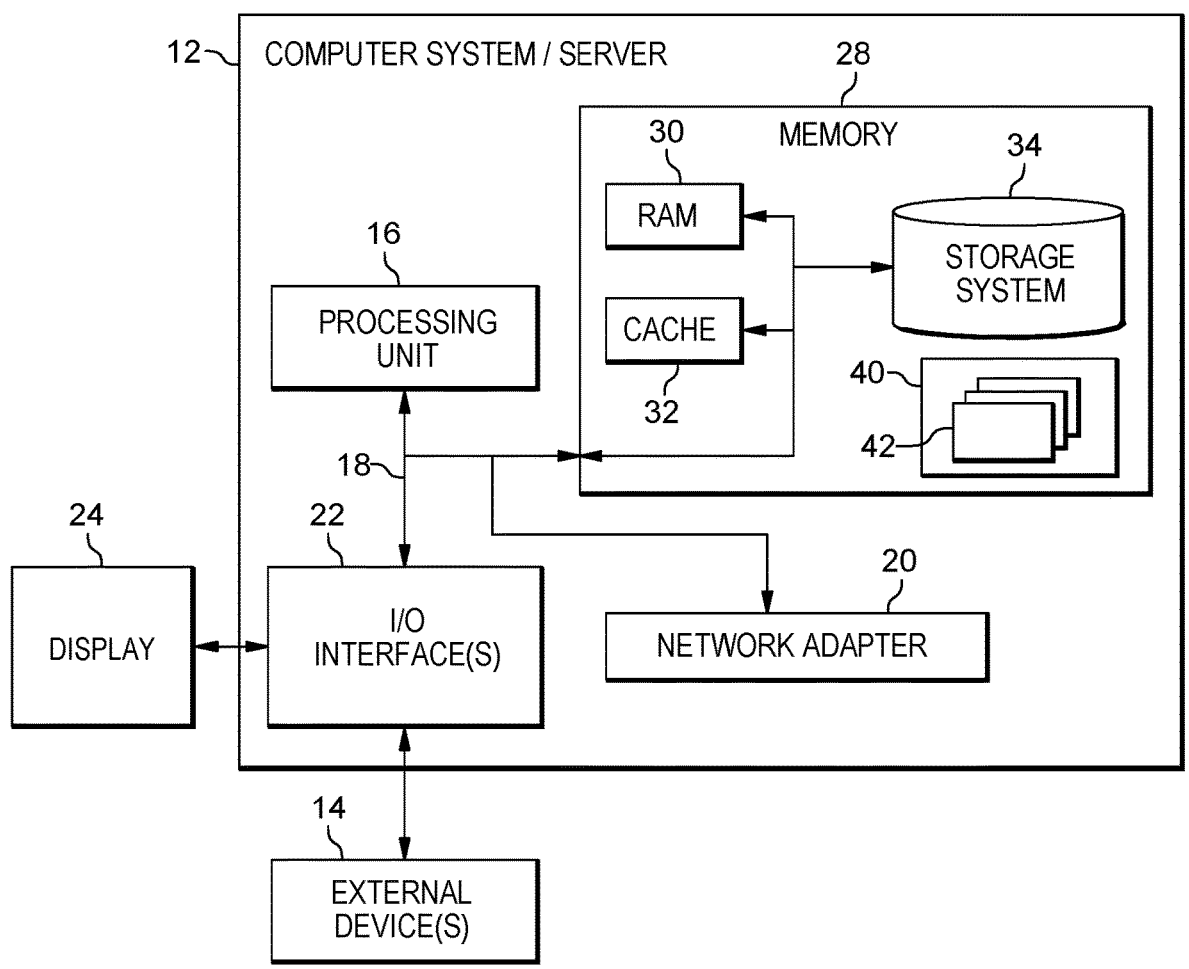
FIG. 5 depicts one embodiment of a computing node that can be utilized in a cloud computing environment.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 5 as program/utility 40, having a set (at least one) of program modules 42, may be stored in memory 28.

One of the challenges of meeting growing vehicle-sharing demands is anticipating the inventory needed at various pickup locations for the vehicles and also, maintaining a working fleet of vehicles. Correctly anticipating both usage and maintenance for a fleet of vehicles, across various distributed pickup locations, can maximize cost and operations efficiency. Meanwhile, a failure to properly anticipate need and wear and tear on vehicles that are part of a fleet of shared vehicles in a sharing system, can result in inefficient expenditures and system downtime. The allocation and maintenance of resources in a personal transportation vehicle sharing system pose some of the same challenges as resource allocation and maintenance of resources across distributed computing environments, including but not limited to, cloud computing systems. A host of issues that may affect the efficiency and run up the costs in a personal transportation vehicle sharing system. These issues can include, but are not limited to: 1) arbitrary or random assignment of resources (personal transportation vehicles) to various locations; 2) ability of users to indiscriminately select their preferred resources at these locations, as well as select the locations at which they will acquire vehicles; 3) fluctuating inventory demands over the course of short time periods (days, hours, etc.); and 4) varying levels of usage of the resources (e.g., inconsistent levels of wear and tear) resulting in different repair cycles for comparable resources put into service at comparable times, rendering any "bulk" approach to maintenance problematic or not possible.

As discussed above, personal vehicle sharing systems are growing in prominence, particularly in urban environments. One aspect of managing a vehicle sharing system is manually moving the vehicles among different pickup and drop-off locations (e.g., station) due to difference in supply and demand. The movement of these resources between locations is commonly referred to as rebalancing or, more specifically, vehicle rebalancing. Maintenance and operating costs for these vehicle sharing systems, as noted above, can be very high.

In existing vehicle sharing systems, stations are provided to users in a somewhat randomized manner; users are free to select whichever vehicle is available at each location. As a result of the random selection (and supply), vehicles experience different levels of wear and tear, due to different levels of usage, by different kinds of users (e.g., levels of expertise in utilizing the vehicle, desire to traverse rough terrain, conditions of common routes traversed, etc.), which necessitate different repair and replace cycles for vehicles, even though these vehicles are in service during the same period of time, rendering bulk repairs (which save resources), impossible, and increasing the operating costs for the vehicle sharing system as a whole. The randomized manner of operation of stations also creates an imbalanced vehicle supply over time, at individual stations. The imbalanced supply may not comport with the demands of the users (e.g., more demand at neighborhood stations in the morning and more demand at public transportation stations in the afternoon). An approach is needed that reduces vehicle sharing system operating costs and improves user experiences. Embodiments of the present invention provides these improvements by utilizing cognitive solutions.

Embodiments of the present invention include a computer-implemented method, a computer program product, and a computer system that include program code executed on at least one processing circuit that generates and utilizes a cognitive method (e.g., a cognitive model) to automatically assign personal transportation vehicle to users and specific locations (e.g., trucks). Embodiments of the present invention comprise a practical application (e.g., mitigating the aforementioned issues experienced in vehicle sharing systems that impact efficiency) utilizing a computer-implemented method, a computer program product, and a computer system. The cognitive method optimizes the operational functionality of a transportation vehicle sharing system, including by maximizing resource utilization, streamlining costs, and optimizing vehicle maintenance procedures. Specifically, by generating and regularly updating a machine learning algorithm and/or model, the program code utilizes the algorithm and/or model to assign a specific personal transportation vehicles to users and/or an identified set of personal transportation vehicles to a given sharing location. In the case where the specific personal transportation vehicles is a bicycle or easily transportable vehicle, the program code can assign the identified set of personal transportation vehicles to a rebalancing truck at sharing location (e.g., station). The program code assigns a vehicle to the user and/or vehicle(s) to the location such that the expected wear and tear of all vehicles in a system have roughly the same repair/replace cycle, and the demand supply in the system is balanced To automatically assign the vehicles, in some embodiments of the present invention, the program code: 1) (with the permission of the users) monitors user usage of personal transportation vehicles, collecting and applying historical usage data for users to generate cognitive profiles for the users at different personal transportation vehicle pickup locations; 2) monitors maintenance data (e.g., historical wear and tear data related to the personal transportation vehicles) to generate cognitive profiles for the personal transportation vehicles; 3) utilizes the maintenance data to generate cognitive profiles for route conditions that affect personal transportation vehicle maintenance (e.g., wear and tear); 4) based on data related to demand and/or supply over time (e.g., historical data), the program code generates a cognitive station profile for each sharing location (e.g., physical locations at which users can obtain and deposit vehicles) to predict supply and demand at the station, in real-time; and 5) based on the generated user, vehicle, route, and station profiles, the program code utilizes a cognitive matching algorithm to assign a specific vehicle to a user and/or to assign one or more vehicles to a station (e.g., a rebalancing truck at a station).

In some embodiments of the present invention, the program code notifies a user of the assignment and/or a truck operator of the assigned vehicles to be transported to the station. In some embodiments of the present invention, a truck is automatically loaded with the assigned vehicles.

The cognitive matching algorithm can be a deep reinforcement learning algorithm, which takes the data noted above and/or the generated profiles as input features, evolving over time. By applying (and continuously tuning) the cognitive matching algorithm, the program code can generate assignments such that the expected wear and tear of all vehicles in a system have roughly the same repair/replace cycle, and the demand supply in the system is balanced.

Embodiments of the present invention are inextricably tied to computing and provide a practical solution utilizing computing resources. For example, embodiments of the present invention are inextricably tied to computing at least because the program code in these embodiments utilizes the digital communication channels and the real-time communications, enabled in a distributed computing environment, and performs a cognitive analysis (accessing resources available based on the connectivity of the computing system) to facilitate the generation and application of a cognitive matching algorithm to assign a specific vehicle to a user and/or to assign one or more vehicles to a station (e.g., a rebalancing truck at a station), thus optimizing usage of the vehicles to ensure efficiency and efficacy throughout a vehicle sharing system.

Additionally, in some embodiments of the present invention, the utilization of applications as a service, via a shared computing environment (e.g., a cloud computing system), is a challenge unique to computing and is addressed with an approach that utilizes features of computing resources to guard the capacity, efficiency, performance, and efficacy, of a vehicle sharing system. Absent aspects in embodiments of the present invention, the performance of the vehicle sharing system would be compromised. As will be explained herein in greater detail, in embodiments of the present invention, the diversity of the data and the ability of the program code to synthesize a variety of data enables the program code to factor information into the (cognitive) analysis, including temporal data, which is synthesized, in real-time, in order to realize the impacts of the issues on users' utilization of a vehicle sharing system to meet defined goals. The assignment of the resources of the system is enabled by this computing-dependent functionality.

Aspects of various embodiments of the present invention can be implemented across a diverse number of systems and technical resources and can coordinate with various technical environment resources. Embodiments of the present invention are platform independent and can be integrated with service management solution that runs business process management (BPM) and/or information technology service management (ITSM). Additionally, aspects of embodiments of the present invention can be implemented as a system component, and/or a software as a service solution. Embodiments of the present invention can be utilized in shared and/or distributed computing environments, including, but not limited to, cloud computing systems. As mentioned above, embodiments of the present invention include program code executing on at least one processor that performs a cognitive analysis of one or more of structured and unstructured data, from a variety of sources (e.g., to generate user, vehicle, maintenance, station, and/or supply/demand profiles). The program code can utilize an existing cognitive agent to perform this analysis, including generating the profiles discussed above, including but not limited to, IBM Watson®. IBM Watson® is a registered trademark of International Business Machines Corporation, Armonk, N.Y., US. For example, in some embodiments of the present invention, the program code interfaces with the application programming interfaces (APIs) that are part of a known cognitive agent, such as the IBM Watson® Application Program Interface (API), a product of International Business Machines Corporation, to identify relationships between sharing locations, vehicles, resources of a technical environment and business priorities of the users of the resources of the technical environment, to generate key performance factors, which the program code associates with issues and prioritizes the issues in accordance with these associated values. In some embodiments of the present invention, in order to process structured and unstructured data that informs the key performance factors, APIs utilized by the one or more programs can include, but are not limited to, Retrieve and Rank (i.e., a service available through the IBM Watson® Developer Cloud that can surface the most relevant information from a collection of documents), concepts/visual insights, trade off analytics, document conversion, and/or relationship extraction.

Embodiments of the present invention provide a practical application in their utilization of computing systems. As explained above, program code executed in embodiments of the present invention performs cognitive analyses that enable the program code to generate assignments such that the expected wear and tear of all vehicles (resources) in a system have roughly the same repair/replace cycle, and the demand supply in the system is balanced within the vehicle sharing system. This presents a tangible advantage over existing approaches to the issues discussed above.

Some embodiments of the present invention include various aspects that provide significantly more than existing approaches to vehicle sharing. In contrast to existing systems, aspects of various embodiments of the present invention provide a feasible approach to generating at least three cognitive profiles (i.e., user, vehicle, and route) for solving distribution and maintenance inefficiencies within a vehicle sharing system. Although some existing approaches collect limited user information, in order to focus on vehicle station management (e.g., user, device, and/or route location or path), these existing approaches, unlike embodiments of the present invention do not generate the predictive algorithms generated by the program code in embodiments of the present invention to address practical issues, including but not limited to, identifying vehicle distributing patterns based on user behaviors, vehicle usage, and route conditions. Unlike existing approaches, embodiments of the present invention include program code executing on one or more processors that performs a cognitive vehicle assignment method, which can include the program code assigning a set of selected vehicles with similar conditions to a vehicle renting station, as a vehicle rebalancing job, based on characteristics program code-generated (cognitive) profiles of users, vehicles, and/or routes.

FIG. 1 is a workflow 100 that illustrates certain aspects of some embodiments of the present invention. In an embodiment of the present invention, with the permission of the user (e.g., the user opts in), program code executing on one or more processors monitors user usage of personal transportation vehicles to generate a cognitive profile for the user at different personal transportation vehicle pickup locations (110). This monitoring can be accomplished based on utilizing data available from various sources and from various computing devices that the user interacts with, including but not limited to, Internet of Things (IoT) devices and other personal computing devices. For example, in some embodiments of the present invention, the program code can generate and continually update a cognitive profile associated with a given user based on that user's digital wardrobe. In some embodiments of the present invention, the data structure can include various elements of a digital wardrobe of a given user or group or users that the program code can (cognitively) analyze when establishing the data structure. As understood by one of skill in the art, a digital wardrobe is a collection of data that can be understood as a unique identifier for a user. A user's digital wardrobe is comprised of all hardware and software that a user interacts with. For example, not only is a user's digital wardrobe comprised of all physical computing devices a user may utilize (e.g., personal computing device, IoT devices, sensors, personal health trackers, physical activity trackers, smart watches, digital thermostat, smart televisions, digital cameras, computerized exercise equipment, smart appliances, etc.), it is also comprised of any software a user utilizes (e.g., social media platforms, ecommerce applications, electronic media subscriptions, electronic media views, etc.). Because of the variety of devices and applications available, those of skill in the art accept that two individuals will not have the same digital wardrobe. Thus, an individual's digital wardrobe can be utilized as a unique identifier for the individual, which can aid the program code in generating a cognitive profile that is not only personalized, but, possibly, unique to the user. In some embodiments of the present invention, the program code can extract data from a digital wardrobe to discover the participation of a user in one or more vehicle sharing systems.

Elements of a digital wardrobe for a given user can be accessed by one or more servers executing the program code of embodiments of the present invention, via a personal computing device utilized by the user to execute a query via communications of the personal computing device with IoT devices. As understood by one of skill in the art, the Internet of Things (IoT) is a system of interrelated computing devices, mechanical and digital machines, objects, animals and/or people that are provided with unique identifiers and the ability to transfer data over a network, without requiring human-to-human or human-to-computer interaction. These communications are enabled by smart sensors, which include, but are not limited to, both active and passive radio-frequency identification (RFID) tags, which utilize electromagnetic fields to identify automatically and to track tags attached to objects and/or associated with objects and people. Smart sensors, such as RFID tags, can track environmental factors related to an object, including but not limited to, location, temperature, and humidity. For example, in embodiments of the present invention, both riders as well as vehicles can be tracked utilizing these sensors. The smart sensors can be utilized to measure temperature, humidity, vibrations, motion, light, pressure and/or altitude. IoT devices also include individual activity and fitness trackers, which include (wearable) devices or applications that include smart sensors for monitoring and tracking fitness-related metrics such as distance walked or run, calorie consumption, and in some cases heartbeat and quality of sleep and include smartwatches that are synced to a computer or smartphone for long-term data tracking. Because the smart sensors in IoT devices carry unique identifiers, a computing system that communicates with a given sensor (e.g., a personal computing device utilized by a user to execute a query) can identify the source of the information. Within the IoT, various devices can communicate with each other and can access data from sources available over various communication networks, including the Internet. Thus, based on communicating with the personal computing device of a user, program code executing on one or more servers can obtain digital wardrobe data from the personal computing device, to generate and update the cognitive profile of the user.

In embodiments of the present invention, a factor contributing to a user profile can be the navigational patterns of a user. For example, a user would have a greater probability of utilizing vehicles at stations proximate to the user. Historical data could be utilized by the program code to learn these behaviors.

Returning to FIG. 1, in some embodiments of the present invention, the program code monitors maintenance data (e.g., historical wear and tear data related to the personal transportation vehicles, maintenance schedules, part replacement, etc.) to generate cognitive profiles for personal transportation vehicles utilized by users in a shared vehicle system (120). Just as the user can be monitored (110) utilizing IoT devices, in some embodiments of the present invention, the maintenance of vehicles is monitored using IoT devices attached to the vehicles. Additionally, in some embodiments of the present invention, a unique identifier can be assigned to each vehicle (e.g., via a smart sensor and/or RFID). The IoT devices themselves can collect data and report on the condition of the vehicles and based on the identifiers, individuals maintaining the vehicles can also input data regarding maintenance issues on the vehicles and resolution of those issues. The program code can generate a cognitive profile for each vehicle utilizing unsupervised learning, wherein the program code learns relationships between elements in a data set (e.g., observational and maintenance data) and classifies the raw data to automatically generate a cognitive profile. In unsupervised learning, the program code searches for indirect hidden structures, patterns and/or features and utilizes these structure, patterns, and/or features to analyze new data.

In some embodiments of the present invention the cognitive profile of a given vehicle may bucket that vehicle into a given group, based on an overall determined condition of the vehicle. In some embodiments of the present invention, in order to generate a cognitive profile for a vehicle (120), the program code can construct a machine learning algorithm, which can be understood as a classifier, as it classifies records (which may represent vehicles) into groups, based on relationships between data elements related to the maintenance of the vehicles. In some embodiments of the present invention, the program code can utilize the frequency of occurrences of features in mutual information to identify and filter out false positives. The program code utilizes the classifier to create a boundary between vehicles of a given condition and the general base of vehicles in the system.

As part of constructing a classifier (machine learning algorithm), the program code may test the classifier to tune its accuracy. In an embodiment of the present invention, the program code feeds the previously identified feature set describing conditions of vehicles within a given vehicle sharing system into a classifier and utilizes the classifier to classify records of vehicles based on the presence or absence of a given condition, which is known before the tuning. As aforementioned, the presence or absence of the condition is not noted explicitly in the records of the data set. When classifying a vehicle of a given condition utilizing the classifier, the program code can indicate a probability of a given condition with a rating on a scale, for example, between 0 and 1, where 1 would indicate a definitive presence. The classifications need not be binary and can also be values in an established scale. The classifier may also exclude certain vehicles, based on maintenance data available, from the condition.

Returning to FIG. 1, in some embodiments of the present invention, program code generates cognitive profiles for route conditions that affect personal transportation vehicle maintenance (e.g., wear and tear) (130). To generate these route profiles, the program code can utilize the maintenance data related to the vehicles as well as other data sources that provide information about various routes and locations. For example, data related to the weather and road conditions can be available from sensors at various locations as well as from third party sources (weather websites, traffic websites, etc.). Vehicles can be equipped with IoT devices to track route conditions and these data can be utilized in assessing a cognitive route profile. In some embodiments of the present invention, the program code generates a profile for a route by utilizing supervised learning (which can also be utilized to generate a user profile). Supervised learning differs from unsupervised learning (which can be utilized to generate a maintenance profile) because in supervised learning, a full set of labeled data is available to train machine learning algorithms utilized by the program code in the analysis. In embodiments of the present invention, the program code maps inputs related to route conditions (based on user manual inputs, IoT data, sensor data, third party data, etc.) to an output based on example input-output pairs, based on an algorithm trained with relevant pairs. In supervised learning, each example is a pair consisting of an input object (typically a vector) and a desired output value (also called the supervisory signal). A supervised learning algorithm analyzes training data and produces an inferred function, which can be used for mapping new examples. An optimal scenario will allow for the algorithm to correctly determine the class labels for unseen instances. This requires the learning algorithm to generalize from raining data to unseen situations in a "reasonable" way (e.g., see inductive bias). Thus, based on route conditions that are obtained by the program code, the program code can classify the route and build a profile comprising the conditions. These conditions can be descriptive of the weather, the visibility, the surface, the altitude, the consistency of the surface, the hazards encountered, the incline, etc. (i.e., factors that would affect the maintenance needs of vehicles traversing the routes).

In some embodiments of the present invention, the program code generates a cognitive station profile for each sharing location (e.g., physical locations at which users can obtain and deposit vehicles) (140). In some embodiments of the present invention, generating a cognitive station profile comprises the program code obtaining data related to demand and/or supply over time (e.g., historical data) to predict supply and demand at the station, in real-time. As with the cognitive route profiling, the program code can utilize supervised learning, based on utilizing the historical data as training data, to generate the profile and predict the supply and demand at a station, in real-time. Thus, the program code can utilize past trends to determine need at a given time, taking into account various conditions at the time that could affect the supply and demand, from past events (weather, time of day, time of the year, current events, etc.).

In some embodiments of the present invention, based on the generated user, vehicle, route, and station profiles, the program code utilizes a cognitive matching algorithm to assign a specific vehicle and/or a class of vehicles matching certain profile attributes, to a user and/or to assign one or more vehicles to a station (e.g., a rebalancing truck at a station) (150). The deep reinforcement learning of taking the profiles as input features can evolve over time. The program code utilizes vehicle, route and station profiles, applies a cognitive matching algorithm (e.g., deep reinforcement learning taking above as input features over time) and assigns a specific vehicle or a set of vehicles to a rebalancing truck at a station, such that the expected wear and tear of all vehicles in a system have the roughly the same repair/replace cycle, and the demand-supply in the system is balanced (160).

Although the elements of FIG. 1 are listed sequentially, the order or elements is a non-limiting example of an order utilized in some embodiments of the present invention. This sequence is provided for illustrative purposes, only. As understood by one of skill in the art, as the generation (110, 120, 130, 140 and evaluation (150, 160) of profiles occur continuously, the various aspects can be reordered. Additionally, the various profiles can be generated by the program code sequentially, in any order, and/or concurrently. The assignment of the users to the vehicles and/or the vehicles to the stations can also be accomplished in any sequence and/or concurrently.

In some embodiments of the present invention, the program code comprises an application executing in a computing resource that is viewable to a user through a graphical user interface (GUI). Thus, participants in the vehicle sharing, including users of the vehicles and individuals responsible for maintenance and load balancing of the fleet of vehicles, can receive notifications, based on the matching and load balancing of the program code. For example, the program code can notify a user of where to pick up a given vehicle and what vehicle to select. Additionally, the program code can notify an individual responsible for maintenance of which vehicles should be maintained and when, as well as which vehicles can be moved in-between stations to balance loads and meet predicted supply and demand requirements.

Figure 2:
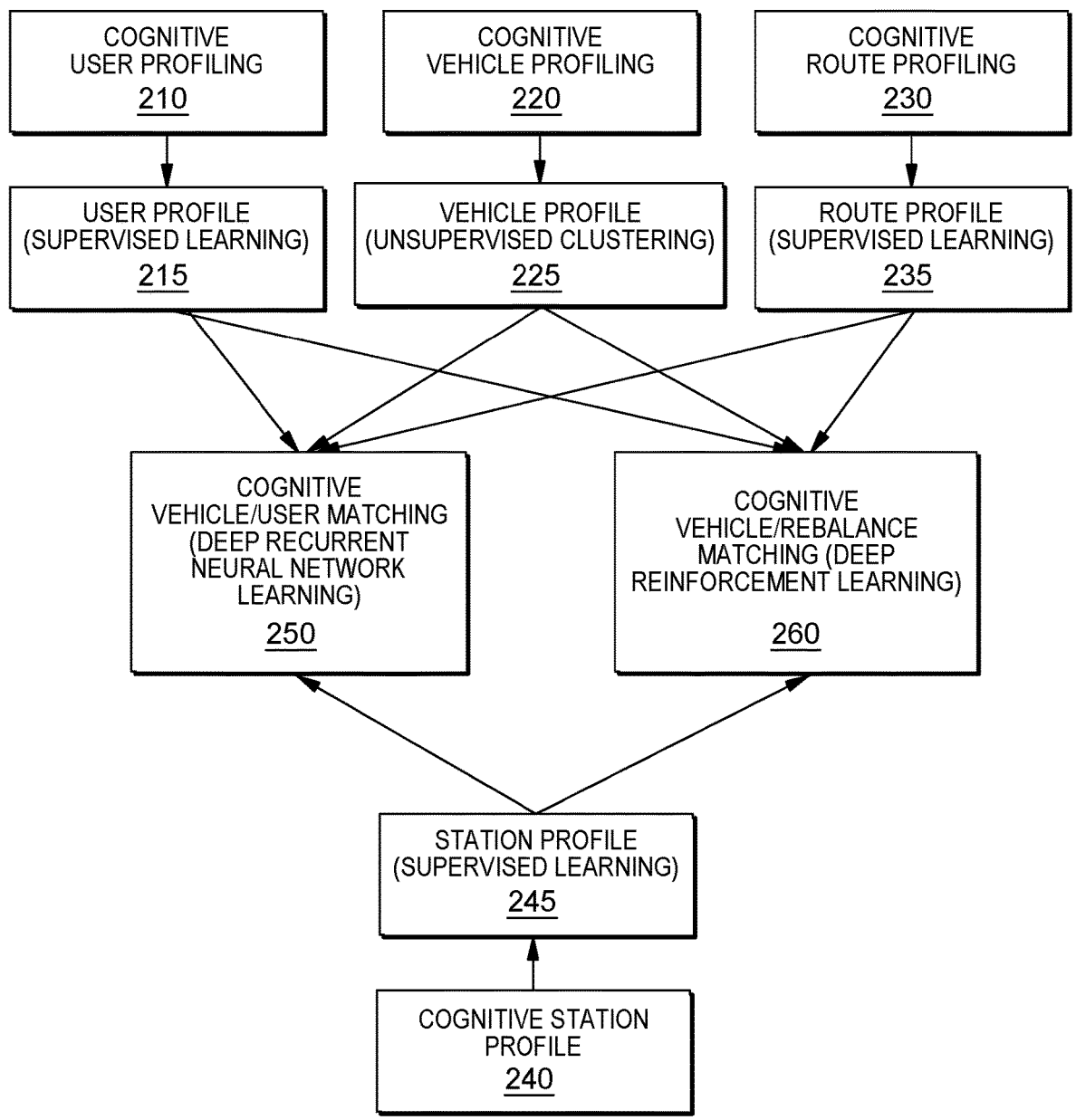
FIG. 2 illustrates various aspects of some embodiments of the present invention.

For ease of understanding, certain embodiments of the present invention can segment certain functionality of the program code, as described in FIG. 1, into various modules. This modular representation is illustrated in FIG. 2, which also presents a workflow 200 in some embodiments of the present invention. This workflow 200, which separates functionality of the program code into modules is provided as an example of how various aspects of the present invention can be understood and/or implemented and not to impose any limitations. As illustrated in FIG. 2, program code comprising a Cognitive User Profiler 210 continuously profiles user rental histories such as distance, time, rent-return station pairs, etc. In some embodiments of the present invention, based on past usage, including navigational patterns, the program code of the Cognitive User Profiler 210 predicts factors about the user related to the vehicle sharing, including but not limited to, a destination, route, an/or rental duration. Thus, the program code comprising the Cognitive User Profiler 210 generates a user profile 215. In the illustrated embodiment of FIG. 2, the Cognitive User Profiler 210 generates the user profile 215 through supervised learning.

In some embodiments of the present invention, program code comprising a Cognitive Vehicle Profiler 220 continuously profiles the vehicle status of vehicles within a vehicle sharing system. The Cognitive Vehicle Profiler 220 collects data, including but not limited to, total time utilized, distance navigated with the given vehicle, and intervals of use and/or lack of use and/or between repairs and/or tuning. In some embodiments of the present invention the Cognitive Vehicle Profiler 220 utilizes a cumulative usage after a latest repair/replace, to cluster a particular vehicle to a specific class. Thus, the vehicle profile 225 generated by the program code of the Cognitive Vehicle Profiler 220 can comprise a class assignment. As illustrated in FIG. 2, the Cognitive Vehicle Profiler 220 can generate a vehicle profile 225 utilizing unsupervised learning.

Some embodiments of the present invention also comprise program code in a Cognitive Route Profiler 230 to continuously profile route conditions (e.g., road roughness). The program code of the Cognitive Route Profiler 230 can generate a route profile 235 with supervised learning.

Embodiments of the present invention can also include program code comprising a Cognitive Station Profiler 240. The Cognitive Station Profiler 240 continuously profiles station demand-supply via parameters including, but not limited to, time, location, and weather. In some embodiments of the present invention, the Cognitive Station Profiler 240 utilizes supervised learning to predict the number of incoming/outgoing vehicles. In some embodiments of the present invention, the program code of the Cognitive Station Profiler 240 generates a station profile 245 utilizing supervised learning.

Program code comprising a Cognitive Vehicle-User Matcher 250 module obtains data comprising the user profile 215, vehicle profile, the vehicle profile 225, the route profile 235, and the station profile 245, and dynamically assigns vehicles to users, such that all vehicles have roughly the same repair and replace cycle. For example, in some embodiments of the present invention, a standard repair cycle of a given timing is established. The program code buckets various vehicles, based on their anticipated usage as a results of the assignments to users, in order to anticipate the repairs to the vehicles beings within a given defined window. For example, the program code can assign vehicles to users such that the vehicles are anticipated to need repairs (based on anticipated usage and/or anticipated wear and tear of the anticipated routes traversed by the users) within a month, give or take a few days. Thus, the Cognitive Vehicle-User Matcher 250 matches vehicles to users such that a repair cycle of once a month can be maintained for each vehicle, based on the assignment. The one month repair cycle is utilized as an example as a different window can be set or otherwise calculated. The Cognitive Vehicle-User Matcher 250 can utilize deep reinforcement learning, which utilizes results from the Cognitive Vehicle Profiler 220, collected and calculated after a vehicle is assigned and in use by a user (e.g., rented) to continuously improve the model. Various aspects of the Cognitive Vehicle-User Matcher 250 are further illustrated and described in FIG. 3.

Program code comprising a Cognitive Vehicle Rebalancer Matcher 260 module obtains data comprising the user profile 215, vehicle profile, the vehicle profile 225, the route profile 235, and the station profile 245, and dynamically assign vehicles to rebalancing solutions, including but not limited to rebalancing trucks, such that demands/supply at stations are balanced. In some embodiments of the present invention, the program code utilizes deep convolutional neural network learning, to predict the supply and demand in a near future window. Various aspects of the Cognitive Vehicle Rebalancer Matcher 260 module are further illustrated and described in FIG. 4.

Figure 3:
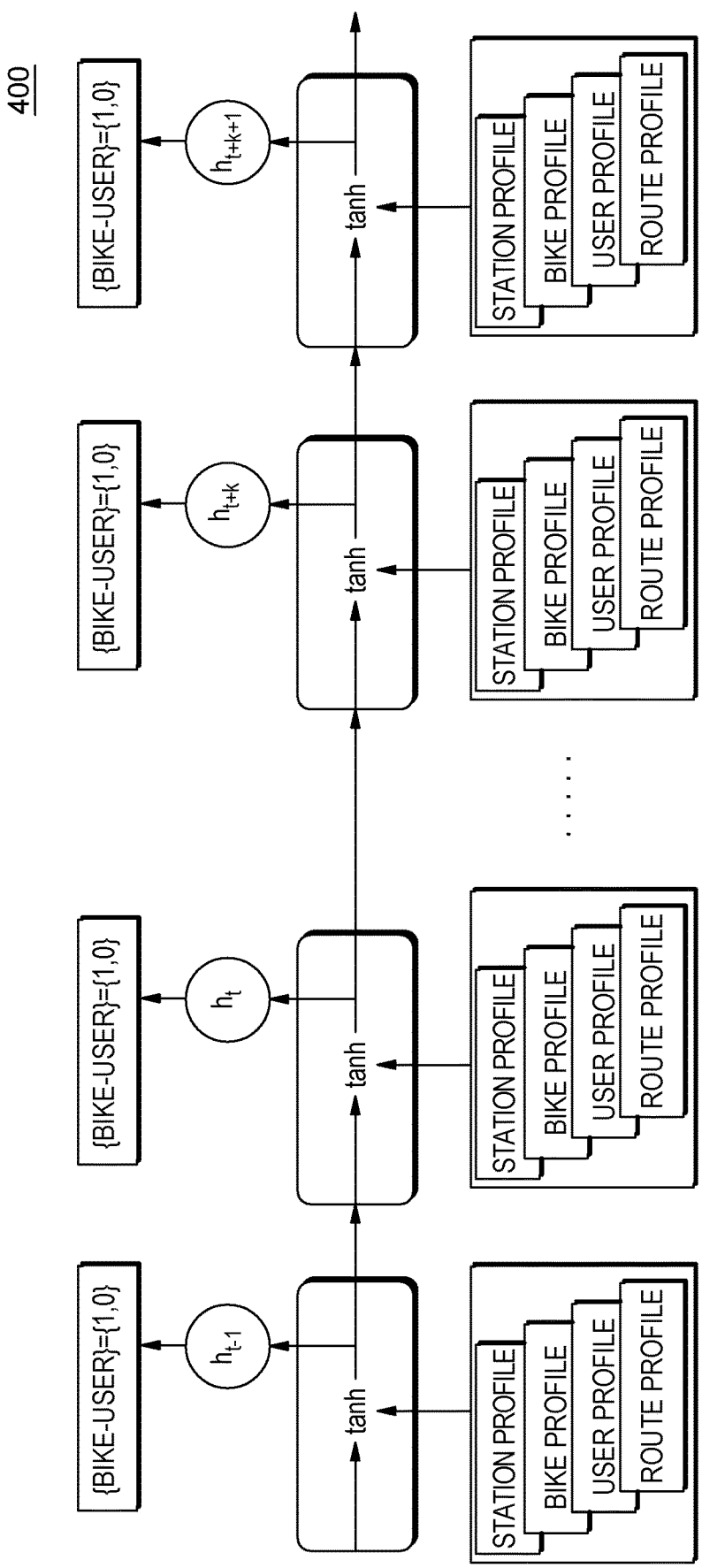
FIG. 3 illustrates various aspects of some embodiments of the present invention.

FIG. 3 is an illustrative diagram 300 that demonstrates the deep recurrent neural network learning of program code in embodiments of the present invention. The program code dynamically assign vehicles to users, such that all vehicles have roughly the same repair and replace cycle. These aspects were discussed as being performed by program code comprising the Cognitive Vehicle Rebalancer Matcher 260 (FIG. 2). In embodiments of the present invention, the program code utilizes, as input features, a vehicle profile, user profile, and route and/or station profiles, at a given (e.g., each) timestamp to assign vehicles to users. The program code determines assignments based on current features, weighing these features, based on learning from one or more previous time stamps. Based on historical data, the program code can determine how various features impact repair cycles for vehicles. Thus, the program code can assign weights to the various attributes and thus can utilize these weights in the deep recurrent neural network learning. The program code utilizes the weights to determine the assignments of the vehicles.

As illustrated in FIG. 3, the program code provide a station profile, vehicle profile, user profile, and/or route profile as inputs to enable the program code to perform deep recurrent neural network learning. The profiles are obtained by the program code at each time stamp. In some embodiments of the present invention, the program code can define intervals for each timestamp (e.g., every minute, every hour, every day, etc.), while in other embodiments of the present invention, the program code continuously obtains these calculate profile values and matches timestamps obtained at input.

In embodiments of the present invention, the program code applies a hyperbolic tangent activation function (i.e., tan h), which is defined as $\tan h(x)=2\cdot\sigma(2x)-1$. In some embodiments of the present invention, another function can be utilized in the machine learning, including but not limited to, a sigmoid function, Softmax, Rectified Linear Unit (ReLU), and/or Leaky ReLU. The purpose of these functions is to classify the objects managed in the calculation. Specifically, the assign users to vehicles. In general, activation functions in neural networks are utilized to determine the output of a neural network (e.g., a yes or no value). An activation function maps the resulting values in between 0 to 1 or −1 to 1 etc. (depending upon the function). The activation function is utilized in embodiments of the present invention to predict the probability as an output. Hyperbolic tangent activation functions can map negative inputs as well as zero inputs and is utilized to classify variable, based on inputs, between two classes. Thus, the hyperbolic tangent activation function can be utilized by the program code in embodiments of the present invention to match a vehicle to a user. As aforementioned, rather than match a specific vehicle, in embodiments of the present invention, the program code can match a user to a class of vehicles, based on maintenance requirements for the vehicle, to equalize the maintenance schedule of all vehicles shared within the system.

Returning to FIG. 3, as further illustrated, the program code utilizes the input values at the various timestamps, applies the function ($h_{t+1}$, $h_t$, $h_{t+k}$, $h_{t+k+1}$) and determines outputs {bike-user}={1,0}.

Figure 4:
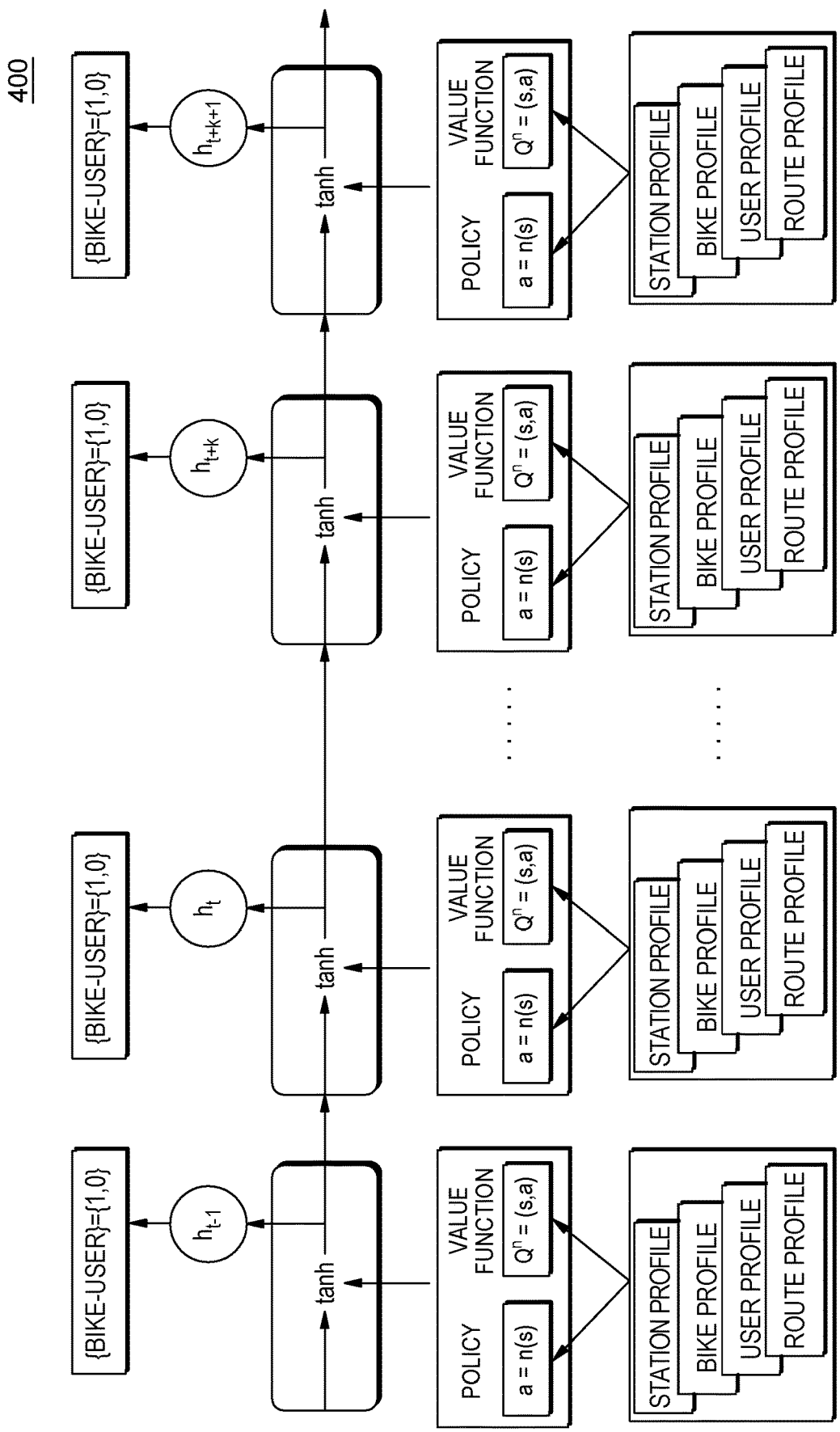
FIG. 4 illustrates various aspects of some embodiments of the present invention.

FIG. 4 is an illustrative diagram 400 that shows deep reinforcement learning undertaken by the program code in some embodiments of the present invention to rebalance vehicles within a sharing system. FIG. 4 further illustrates the functionality of the program code comprising the Cognitive Vehicle-User Matcher 250 module (FIG. 2), which dynamically assign vehicles to rebalancing solutions, including but not limited to, rebalancing trucks, such that demands/supply at stations are balanced. As illustrated in FIG. 4, the program code utilizes deep convolutional neural network learning, to predict the supply and demand in a near future window.

In embodiments of the present invention, the program code utilizes, as input features, a vehicle profile, user profile, and route and/or station profiles, at a given timestamp to dynamically assign vehicles to rebalancing trucks, based on a predicted supply and demand at a future window. The program code determines current vehicle matching (e.g., matching vehicles to users and/or vehicles to stations (rebalancing supply)) by utilizing current features as well as weights determined (learned) from the input values at one or more previous time stamps. Through this deep learning and also, in some embodiments of the present invention, the utilization of a neural network enables the program code to generate a policy to determine whether a vehicle should be assigned to a rebalancing truck at a station. The program code utilizes a value function to represent a total reward from a vehicle state and an action under the policy. The program code generates a transition model with deep reinforcement learning.

As aforementioned, FIG. 4 illustrates cognitive vehicle rebalancing matching. As illustrated in FIG. 4, the program code obtains, as input variables, a station profile, a vehicle profile, a user profile, and a route profile, at a given timestamp. The program code applies a policy, a=n(s), to determine whether a vehicle should be assigned to a rebalancing truck at a given station, where "a" represents an action under the policy (e.g., assignment, "s" represents a state if a vehicle, and "n" represents the vehicle. The program code also applies a value function, $Q^n=(s, a)$ to determine a total reward (Q) from the vehicle state (s) and an action (a) under a policy (e.g., assignment). The program code generates a transition model which can include applying a hyperbolic tangent function (i.e., tan h), individually, for various timestamps (e.g., $h_{t-1}$, $h_t$, $h_{t+k}$, $h_{t+k+1}$). The program code can determine, at a given current instant, an assignment of a vehicle to station for rebalancing, which involves assigning a vehicle to a rebalancing truck and/or a vehicle to a user (who utilizes a given station) (e.g., {bike-station}={1,0}).

As discussed above, in some embodiments of the present invention, the program code utilizes a neural network to analyze user data and generate the data structures. Neural networks are a biologically-inspired programming paradigm which enable a computer to learn from observational data, in this case, a station profile, vehicle profile, user profile, and/or route profile. This learning is referred to as deep learning, which is a set of techniques for learning in neural networks. Neural networks, including modular neural networks, are capable of pattern recognition with speed, accuracy, and efficiency, in situations where data sets are multiple and expansive, including across a distributed network, including but not limited to, cloud computing systems. Modern neural networks are non-linear statistical data modeling tools. They are usually used to model complex relationships between inputs and outputs or to identify patterns in data (i.e., neural networks are non-linear statistical data modeling or decision making tools). In general, program code utilizing neural networks can model complex relationships between inputs and outputs and identify patterns and attributes in data. Because of the speed and efficiency of neural networks, especially when parsing multiple complex data sets, neural networks and deep learning both provide solutions to ingesting and organizing data from diverse sources. In fact, neural networks can be used to solve many problems where data inputs are varied and can include natural language processing, which is relevant to embodiments of the present invention when determining the various profiles.

Some embodiments of the present invention may utilize a neural network to predict additional attributes of a user, for inclusion in the data structure, based on the inputs provided. Utilizing the neural network, the program code can predict subsequent data. The program code obtains (or derives) the initial attributes from a user profile, a vehicle profile, a route profile, and/or a station profile to generate an array of values (possible attributes) to input into input neurons of the neural network. Responsive to these inputs, the output neurons of the neural network produce an array that includes the identified attributes as well as the predicted attributes. The neural network can also be utilized to process the data of multiple users simultaneously, and in processing these data, the program code can generate and predict relationships between users for utilization in the data structures.

In some embodiments of the present invention, a neuromorphic processor or trained neuromorphic chip can be incorporated into the computing resources executing the program code. One example of a trained neuromorphic chip that can be utilized in an embodiment of the present invention is the IBM® TrueNorth chip, produced by International Business Machines Corporation. IBM® is a registered trademark of International Business Machines Corporation, Armonk, N.Y., U.S.A.

Although embodiments of the present invention are discussed in the context of vehicle management in a vehicle sharing system, various aspects of embodiments of the present invention can be to various systems that share resources. In these sharing systems, maintenance costs can also be problematic if maintenance is not managed. For example, computing resources, including but not limited to wearable image capture devices can be utilized in a sharing system.

Embodiments of the present invention include a computer-implemented method, a computer program product, and a computer system where program code executing on one or more processors of a transportation resource sharing system generates a cognitive user profile representing patterns of usage of each of a plurality of users of the transportation resource sharing system, where each user utilized at least one resource of a plurality of resources in the transportation resource sharing system, over time, the at least one resource obtained by each user from at least one resource station of a plurality of stations, where each resource station of the plurality of stations comprises a physical location where each user collects or deposits the at least one resource. The program code generates a cognitive resource profile for each resource of the plurality of resources, based on classifying each resource in a defined maintenance level, where the defined maintenance level is selected from a ranked scale of defined maintenance levels, where the generating comprises analyzing raw data comprising historical maintenance events for each resource to machine learn one or more relationships between elements in the raw data, and classifying each resource into the defined maintenance level, based on the learned one or more relationships. The program code generates a cognitive route profile for each route traversed by at least one resource of the plurality of resources, based on analyzing continuously collected data related to route conditions of each route, where, for each route, the cognitive route profile characterizes the conditions on the route impacting viability of resources of the plurality of resources traversing the route. The program code generates a cognitive station profile for each station of the plurality of stations, each profile representing current supply and demand requirements at each station, where determining the supply and demand requirements at each station comprises analyzing historical supply and demand data accessible to the one or more processors and applying a predictive algorithm to generate the current supply and demand requirements. The program code assigns one or more specific resources of the plurality of resources to one or more specific users of the plurality of users, based on applying a cognitive matching algorithm to inputs comprising the cognitive user profile for each user, the cognitive resource profile for each resource, the cognitive route profile for each route, and the cognitive station profile for each station, where the assigning establishing a common maintenance cycle for the one or more specific resources. The program code assigns the one or more specific resources of the plurality of resources to one or more specific stations of the plurality of stations, based on applying an additional cognitive matching algorithm to the inputs, where the assigning balances supply of resources of the plurality of resources, to meet a predicted demand for resources of the plurality of resources, at one or more specific stations.

In some embodiments of the present invention, the inputs to the cognitive matching algorithm and the additional cognitive matching algorithm comprise a common timestamp.

In some embodiments of the present invention, the program code generating the cognitive user profile comprises, for each user: the program code continuously monitoring one or more data sources to obtain historical data relevant to usage of the user of the at least one resource; and the program code generating and training, based on the historical data, a predictive model, where the predictive model is utilized by the one or more processors, to formulate the patterns of usage of the user of at the least one resource comprising the cognitive user profile.

In some embodiments of the present invention, the program code generating the cognitive route profile comprises, for each route: the program code continuously monitoring the one or more data sources to obtain the continuously collected data related to route conditions of the route; and the program code generating and training based on the continuously collected data, a predictive model, where the predictive model is utilized by the one or more processors, to formulate patterns characterizing the conditions on the route impacting the viability of the resources of the plurality of resources traversing the route comprising the cognitive route profile.

In some embodiments of the present invention, the program code generating the cognitive station profile comprises, for each station: the program code continuously monitoring the one or more data sources to obtain the historical supply and demand data for the station; and the program code generating and training based on the historical supply and demand data for the station, a predictive model, where the predictive model is utilized by the one or more processors, to formulate patterns comprising the predictive algorithm to generate the current supply and demand requirements.

In some embodiments of the present invention, the program code determines the predicted demand for resources of the plurality of resources, at one or more specific stations, where the determining comprises utilizing deep convolutional neural network learning, to generate the predicted demand.

In some embodiments of the present invention, the predicted demand for resources of the plurality of resources, at one or more specific stations comprises the predicted demand in a near future window.

In some embodiments of the present invention, the program code assigning the one or more specific resources of the plurality of resources to the one or more specific stations of the plurality of stations further comprises utilizing a neural network to generate a policy to assign a portion of the one or more specific resources one or more rebalancing trucks at the one or more specific stations.

In some embodiments of the present invention, the program code utilizing the neural network comprises the program code utilizing a value function to represent a total reward from a vehicle state of each vehicle of the plurality of vehicles and to determine an action for each vehicle under the policy.

In some embodiments of the present invention, for each vehicle, the action is selected from the group consisting of: assigning the vehicle to a rebalancing truck of the one or more rebalancing trucks, and not assigning the vehicle to the rebalancing truck of the one or more rebalancing trucks.

In some embodiments of the present invention, as aspect includes redistributing a portion of one or more specific resources among a portion of the one or more specific stations of the plurality of stations based on assigning the one or more specific resources of the plurality of resources to the one or more specific users of the plurality of users.

In some embodiments of the present invention, an aspect includes redistributing a portion of one or more specific resources among a portion of the one or more specific stations of the plurality of stations based on assigning the one or more specific resources of the plurality of resources to one or more specific stations of the plurality of stations.

Referring now to FIG. 5, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention, program code executing the modules discussed in FIG. 2 and/or the IoT devices and other sources of data for the profiles can each be understood as a cloud computing node 10 (FIG. 5) and if not a cloud computing node 10, then one or more general computing nodes that include aspects of the cloud computing node 10.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 that can be utilized as cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired aF1pplications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
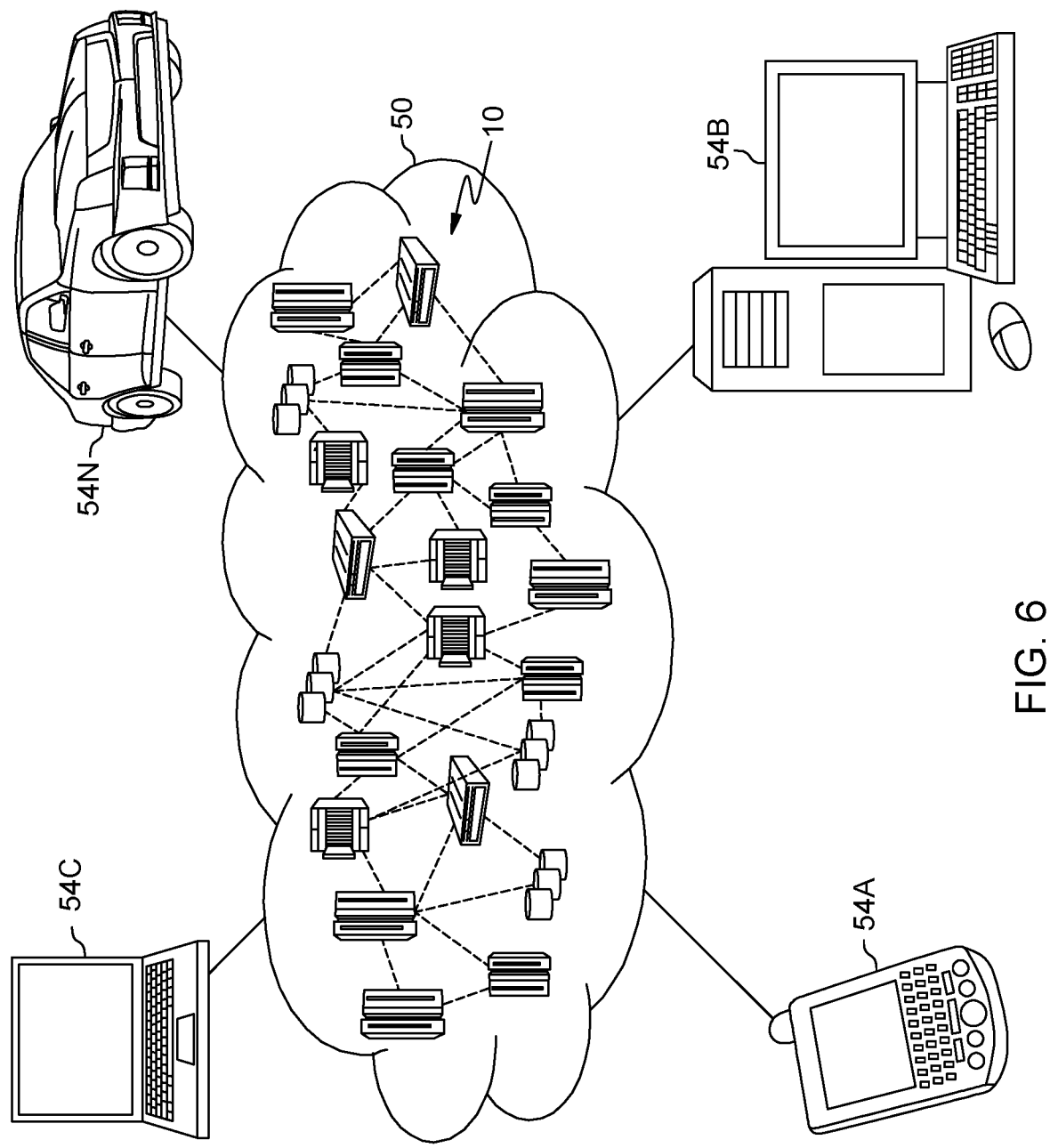
FIG. 6 depicts a cloud computing environment according to an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
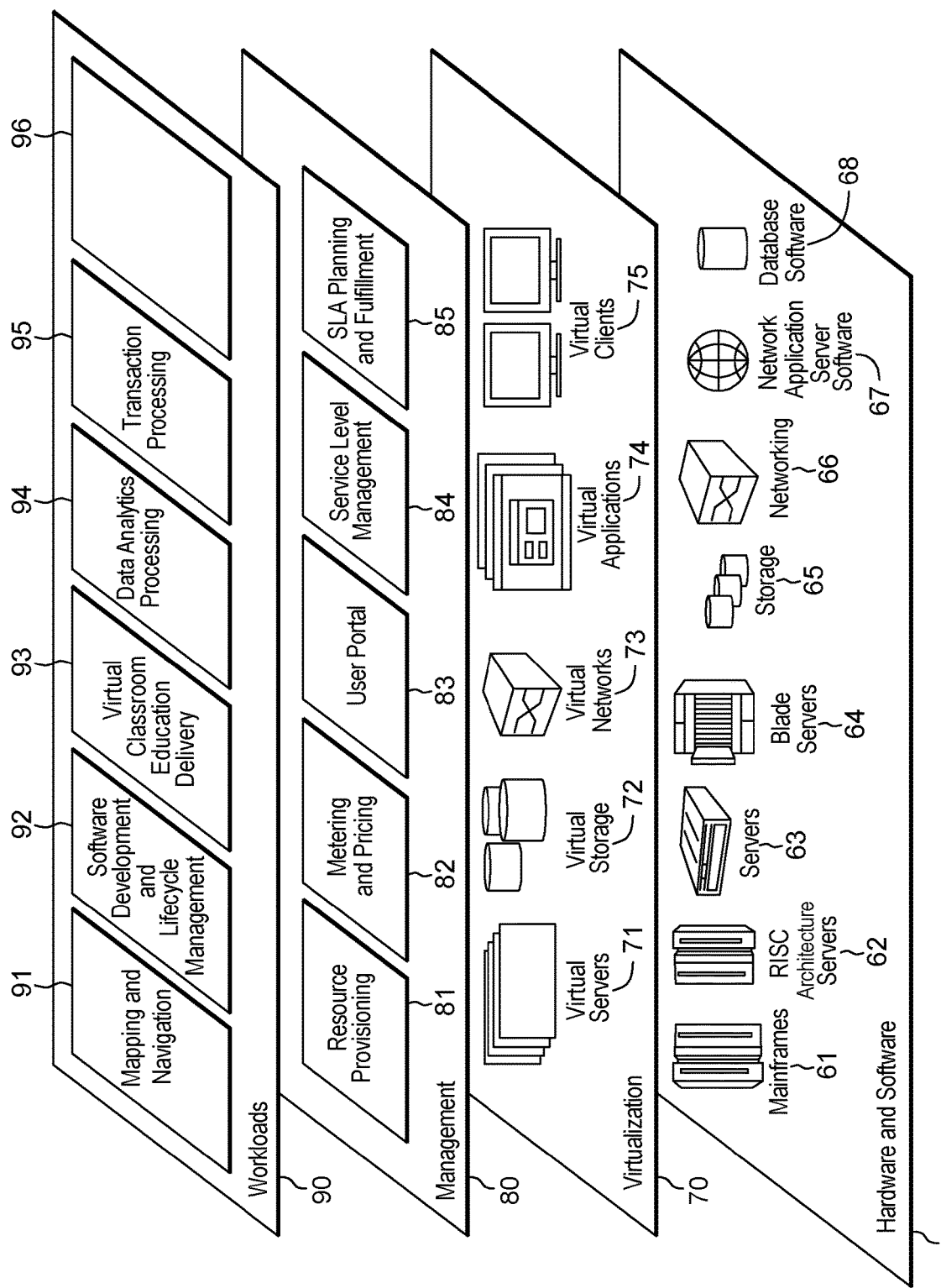
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cognitive assignment of entities, including matching of entities, within a vehicle sharing system 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising:
    generating, by one or more processors of a transportation resource sharing system, a cognitive user profile representing patterns of usage of each user of a plurality of users of the transportation resource sharing system, wherein each user of the plurality of users utilized at least one resource of a plurality of resources in the transportation resource sharing system, over time, the at least one resource obtained by each user of the plurality of users from at least one resource station of a plurality of stations, wherein each resource station of the plurality of stations comprises a physical location where each user of the plurality of users collects or deposits the at least one resource;
    generating, by the one or more processors, a cognitive resource profile for each resource of the plurality of resources, based on classifying each resource in a defined maintenance level, wherein the defined maintenance level is selected from a ranked scale of defined maintenance levels, wherein generating the cognitive resource profile comprises analyzing raw data comprising historical maintenance events for each resource to machine learn one or more relationships between elements in the raw data, and classifying, by the one or more processors, each resource into the defined maintenance level, based on the learned one or more relationships;
    generating, by the one or more processors, a cognitive route profile for each route traversed by at least one resource of the plurality of resources, based on analyzing continuously collected data related to route conditions of each route, wherein, for each route, the cognitive route profile characterizes the conditions on the route impacting viability of resources of the plurality of resources traversing the route;
    generating, by the one or more processors, a cognitive station profile for each station of the plurality of stations, each profile representing current supply and demand requirements at each station, wherein determining the supply and demand requirements at each station comprises analyzing historical supply and demand data accessible to the one or more processors and applying a predictive algorithm to generate the current supply and demand requirements;
    assigning, by the one or more processors, one or more specific resources of the plurality of resources to one or more specific users of the plurality of users to a first group, based on applying a cognitive matching algorithm to inputs comprising the cognitive user profile for each user of the plurality of users, the cognitive resource profile for each resource, the cognitive route profile for each route, and the cognitive station profile for each station, wherein the assigning establishes a common maintenance cycle for the first group wherein establishing the common maintenance cycle based on the assigning enables each resource of the first group to be maintained with a singular repair and replace cycle based on an expected wear and tear of each resource of the first group being predicted by the one or more processors to be in similar condition, wherein to generate the cognitive resource profile for each resource the one or more processors utilize a classifier to classify each resource into groups based on relationships between data elements related to the maintenance of the resources and utilize the frequency of occurrences of features in mutual information to identify and filter out false positives and to create a boundary between resources of the similar condition and a general base of resources of the plurality of resources;
    assigning, by the one or more processors, the first group to one or more specific stations of the plurality of stations, based on applying an additional cognitive matching algorithm to the inputs, wherein the assigning balances supply of resources of the plurality of resources, to meet a predicted demand for resources of the plurality of resources, at the one or more specific stations of the plurality of stations, wherein assigning the first group to the one or more specific stations of the plurality of stations further comprises utilizing a neural network to generate a policy to assign a portion of the first group to one or more rebalancing trucks at the one or more specific stations, and wherein utilizing the neural network comprises utilizing a value function to represent a total reward from a resource state and from a possible action under the policy of each resource of the plurality of resources and to determine an action for each resource under the policy; and
    based on the assigning, resource rebalancing at least a portion of the plurality of resources between the plurality of stations.

2. The computer-implemented method of claim 1, wherein the inputs to the cognitive matching algorithm and the additional cognitive matching algorithm comprise a common timestamp.

3. The computer-implemented method of claim 1, wherein generating the cognitive user profile comprises, for each user of the plurality of users:
continuously monitoring, by the one or more processors, one or more data sources to obtain historical data relevant to usage of the user of the at least one resource; and
generating and training, by the one or more processors, based on the historical data, a predictive model, wherein the predictive model is utilized by the one or more processors, to formulate the patterns of usage of the user of at the least one resource comprising the cognitive user profile.

4. The computer-implemented method of claim 1, wherein generating the cognitive route profile comprises, for each route:
continuously monitoring, by the one or more processors, the one or more data sources to obtain the continuously collected data related to route conditions of the route; and
generating and training, by the one or more processors, based on the continuously collected data, a predictive model, wherein the predictive model is utilized by the one or more processors, to formulate patterns characterizing the conditions on the route impacting the viability of the resources of the plurality of resources traversing the route comprising the cognitive route profile.

5. The computer-implemented method of claim 1, wherein generating the cognitive station profile comprises, for each station:
continuously monitoring, by the one or more processors, the one or more data sources to obtain the historical supply and demand data for the station; and
generating and training, by the one or more processors, based on the historical supply and demand data for the station, a predictive model, wherein the predictive model is utilized by the one or more processors, to formulate patterns comprising the predictive algorithm to generate the current supply and demand requirements.

6. The computer-implemented method of claim 1, further comprising:
determining, by the one or more processors, the predicted demand for resources of the plurality of resources, at the one or more specific stations of the plurality of stations, wherein the determining comprises utilizing deep convolutional neural network learning, to generate the predicted demand.

7. The computer-implemented method of claim 6, wherein the predicted demand for resources of the plurality of resources, at the one or more specific stations of the plurality of stations comprises the predicted demand in a future defined one month window.

8. The computer-implemented method of claim 1, wherein for each resource, the action is selected from the group consisting of: assigning the resource to a rebalancing truck of the one or more rebalancing trucks, and not assigning the resource to the rebalancing truck of the one or more rebalancing trucks.

9. The computer-implemented method of claim 1, further comprising:
redistributing a portion of the first group among a portion of the one or more specific stations of the plurality of stations based on assigning the first group to the one or more specific users of the plurality of users.

10. The computer-implemented method of claim 1, further comprising:
redistributing a portion of the first group among a portion of the one or more specific stations of the plurality of stations based on assigning the first group to the one or more specific stations of the plurality of stations.

11. A computer program product comprising:
a computer readable storage medium readable by one or more processors and storing instructions for execution by the one or more processors for performing a method comprising:
generating, by the one or more processors of a transportation resource sharing system, a cognitive user profile representing patterns of usage of each user of a plurality of users of the transportation resource sharing system, wherein each user of the plurality of users utilized at least one resource of a plurality of resources in the transportation resource sharing system, over time, the at least one resource obtained by each user of the plurality of users from at least one resource station of a plurality of stations, wherein each resource station of the plurality of stations comprises a physical location where each user of the plurality of users collects or deposits the at least one resource;
generating, by the one or more processors, a cognitive resource profile for each resource of the plurality of resources, based on classifying each resource in a defined maintenance level, wherein the defined maintenance level is selected from a ranked scale of defined maintenance levels, wherein generating the cognitive resource profile comprises analyzing raw data comprising historical maintenance events for each resource to machine learn one or more relationships between elements in the raw data, and classifying, by the one or more processors, each resource into the defined maintenance level, based on the learned one or more relationships;
generating, by the one or more processors, a cognitive route profile for each route traversed by at least one resource of the plurality of resources, based on analyzing continuously collected data related to route conditions of each route, wherein, for each route, the cognitive route profile characterizes the conditions on the route impacting viability of resources of the plurality of resources traversing the route;
generating, by the one or more processors, a cognitive station profile for each station of the plurality of stations, each profile representing current supply and demand requirements at each station, wherein determining the supply and demand requirements at each station comprises analyzing historical supply and demand data accessible to the one or more processors and applying a predictive algorithm to generate the current supply and demand requirements;
assigning, by the one or more processors, one or more specific resources of the plurality of resources to one or more specific users of the plurality of users to a first group, based on applying a cognitive matching algorithm to inputs comprising the cognitive user profile for each user of the plurality of users, the cognitive resource profile for each resource, the cognitive route profile for each route, and the cognitive station profile for each station, wherein the assigning establishes a common maintenance cycle for the first group, wherein establishing the common maintenance cycle based on the assigning enables each resource of the first group to be maintained with a singular repair and replace cycle based on an expected wear and tear of each resource of the first group being predicted by the one or more processors to be in similar condition, wherein to generate the cognitive resource profile for each resource the one or more processors utilize a classifier to classify each resource into groups based on relationships between data elements related to the maintenance of the resources and utilize the frequency of occurrences of features in mutual information to identify and filter out false positives and to create a boundary between resources of the similar condition and a general base of resources of the plurality of resources;

assigning, by the one or more processors, the first group to one or more specific stations of the plurality of stations, based on applying an additional cognitive matching algorithm to the inputs, wherein the assigning balances supply of resources of the plurality of resources, to meet a predicted demand for resources of the plurality of resources, at the one or more specific stations of the plurality of stations, wherein assigning the first group to the one or more specific stations of the plurality of stations further comprises utilizing a neural network to generate a policy to assign a portion of the first group to one or more rebalancing trucks at the one or more specific stations, and wherein utilizing the neural network comprises utilizing a value function to represent a total reward from a resource state and from a possible action under the policy of each resource of the plurality of resources and to determine an action for each resource under the policy; and based on the assigning, resource rebalancing at least a portion of the plurality of resources between the plurality of stations.

12. The computer program product of claim 11, wherein the inputs to the cognitive matching algorithm and the additional cognitive matching algorithm comprise a common timestamp.

13. The computer program product of claim 11, wherein generating the cognitive user profile comprises, for each user of the plurality of users:

continuously monitoring, by the one or more processors, one or more data sources to obtain historical data relevant to usage of the user of the at least one resource; and generating and training, by the one or more processors, based on the historical data, a predictive model, wherein the predictive model is utilized by the one or more processors, to formulate the patterns of usage of the user of at the least one resource comprising the cognitive user profile.

14. The computer program product of claim 11, wherein generating the cognitive route profile comprises, for each route:

continuously monitoring, by the one or more processors, the one or more data sources to obtain the continuously collected data related to route conditions of the route; and generating and training, by the one or more processors, based on the continuously collected data, a predictive model, wherein the predictive model is utilized by the one or more processors, to formulate patterns characterizing the conditions on the route impacting the viability of the resources of the plurality of resources traversing the route comprising the cognitive route profile.

15. The computer program product of claim 11, wherein generating the cognitive station profile comprises, for each station:

continuously monitoring, by the one or more processors, the one or more data sources to obtain the historical supply and demand data for the station; and generating and training, by the one or more processors, based on the historical supply and demand data for the station, a predictive model, wherein the predictive model is utilized by the one or more processors, to formulate patterns comprising the predictive algorithm to generate the current supply and demand requirements.

16. The computer program product of claim 11, further comprising:

determining, by the one or more processors, the predicted demand for resources of the plurality of resources, at the one or more specific stations of the plurality of stations, wherein the determining comprises utilizing deep convolutional neural network learning, to generate the predicted demand.

17. The computer program product of claim 16, wherein the predicted demand for resources of the plurality of resources, at the one or more specific stations of the plurality of stations comprises the predicted demand in a defined one month future window.

18. A system comprising:

a memory;

one or more processors in communication with the memory;

program instructions executable by the one or more processors via the memory to perform a method, the method comprising:

generating, by the one or more processors of a transportation resource sharing system, a cognitive user profile representing patterns of usage of each user of a plurality of users of the transportation resource sharing system, wherein each user of the plurality of users utilized at least one resource of a plurality of resources in the transportation resource sharing system, over time, the at least one resource obtained by each user of the plurality of users from at least one resource station of a plurality of stations, wherein each resource station of the plurality of stations comprises a physical location where each user of the plurality of users collects or deposits the at least one resource;

generating, by the one or more processors, a cognitive resource profile for each resource of the plurality of resources, based on classifying each resource in a defined maintenance level, wherein the defined maintenance level is selected from a ranked scale of defined maintenance levels, wherein generating the cognitive resource profile comprises analyzing raw data comprising historical maintenance events for each resource to machine learn one or more relationships between elements in the raw data, and classifying, by the one or more processors, each resource into the defined maintenance level, based on the learned one or more relationships;

generating, by the one or more processors, a cognitive route profile for each route traversed by at least one resource of the plurality of resources, based on analyzing continuously collected data related to route conditions of each route, wherein, for each route, the cognitive route profile characterizes the conditions on the route impacting viability of resources of the plurality of resources traversing the route;

generating, by the one or more processors, a cognitive station profile for each station of the plurality of stations, each profile representing current supply and demand requirements at each station, wherein determining the supply and demand requirements at each station comprises analyzing historical supply and demand data accessible to the one or more processors and applying a predictive algorithm to generate the current supply and demand requirements;

assigning, by the one or more processors, one or more specific resources of the plurality of resources to one or more specific users of the plurality of users to a first group, based on applying a cognitive matching algorithm to inputs comprising the cognitive user profile for each user of the plurality of users, the cognitive resource profile for each resource, the cognitive route profile for each route, and the cognitive station profile for each station, wherein the assigning establishes a common maintenance cycle for the first group, wherein establishing the common maintenance cycle based on the assigning enables each resource of the first group to be maintained with a singular repair and replace cycle based on an expected wear and tear of each resource of the first group being predicted by the one or more processors to be in similar condition, wherein to generate the cognitive resource profile for each resource the one or more processors utilize a classifier to classify each resource into groups based on relationships between data elements related to the maintenance of the resources and utilize the frequency of occurrences of features in mutual information to identify and filter out false positives and to create a boundary between resources of the similar condition and a general base of resources of the plurality of resources;

assigning, by the one or more processors, the first group to one or more specific stations of the plurality of stations, based on applying an additional cognitive matching algorithm to the inputs, wherein the assigning balances supply of resources of the plurality of resources, to meet a predicted demand for resources of the plurality of resources, at the one or more specific stations of the plurality of stations, wherein assigning the first group to the one or more specific stations of the plurality of stations further comprises utilizing a neural network to generate a policy to assign a portion of the first group to one or more rebalancing trucks at the one or more specific stations, and wherein utilizing the neural network comprises utilizing a value function to represent a total reward from a resource state and from a possible action under the policy of each resource of the plurality of resources and to determine an action for each resource under the policy; and based on the assigning, resource rebalancing at least a portion of the plurality of resources between the plurality of stations.

* * * * *